(12) United States Patent
Li

(10) Patent No.: US 12,436,225 B2
(45) Date of Patent: Oct. 7, 2025

(54) POSITIONING MEASUREMENT METHOD, POSITIONING MEASUREMENT APPARATUS AND STORAGE MEDIUM

(71) Applicant: Beijing Xiaomi Mobile Software Co., Ltd., Beijing (CN)

(72) Inventor: Mingju Li, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 362 days.

(21) Appl. No.: 18/013,831

(22) PCT Filed: Jul. 23, 2020

(86) PCT No.: PCT/CN2020/103871
§ 371 (c)(1),
(2) Date: Dec. 29, 2022

(87) PCT Pub. No.: WO2022/016468
PCT Pub. Date: Jan. 27, 2022

(65) Prior Publication Data
US 2023/0296721 A1    Sep. 21, 2023

(51) Int. Cl.
*G01S 5/02* (2010.01)
*G01S 5/00* (2006.01)

(52) U.S. Cl.
CPC .......... *G01S 5/0263* (2013.01); *G01S 5/0036* (2013.01); *G01S 5/0236* (2013.01); *G01S 2205/008* (2013.01)

(58) Field of Classification Search
CPC ..... G01S 5/0263; G01S 5/0036; G01S 5/0236
(Continued)

(56) References Cited

U.S. PATENT DOCUMENTS

| 2011/0294515 A1 | 12/2011 | Chen et al. |
| 2014/0066094 A1 | 3/2014 | Siomina et al. |

(Continued)

FOREIGN PATENT DOCUMENTS

| CN | 1744763 A | 3/2006 |
| CN | 102223710 A | 10/2011 |

(Continued)

OTHER PUBLICATIONS

"3GPP TR 21.915" Release 16 Description, Jul. 2020 (Jul. 2020), entire document; Type-A, 115 pgs.

*Primary Examiner* — Harry K Liu
(74) *Attorney, Agent, or Firm* — Volpe Koenig

(57) ABSTRACT

A positioning measurement method, a positioning measurement apparatus, and a storage medium that reduce power consumption and improve performance of the communication system. The power consumption and performance of the communication system are improved by a terminal and includes: obtaining first configuration information and second configuration information that are sent by a first-type positioning node or a location management function entity, where the first configuration information is used to instruct the terminal to transmit and/or receive a first positioning signal for performing positioning measurement with the first-type positioning node, and the second configuration information is used to instruct the terminal to transmit and/or receive a second positioning signal for performing positioning measurement with a second-type positioning node.

20 Claims, 6 Drawing Sheets

(58) Field of Classification Search
USPC .......................................................... 342/451
See application file for complete search history.

(56) References Cited

U.S. PATENT DOCUMENTS

| | | |
|---|---|---|
| 2016/0037301 A1 | 2/2016 | Davydov et al. |
| 2018/0128893 A1 | 5/2018 | Tang et al. |
| 2020/0374829 A1 | 11/2020 | Zhu et al. |
| 2021/0092561 A1 | 3/2021 | Li et al. |

FOREIGN PATENT DOCUMENTS

| | | | | |
|---|---|---|---|---|
| CN | 106538004 A | | 3/2017 | |
| CN | 109565780 A | * | 4/2019 | ............. G01S 1/042 |
| CN | 110166928 A | | 8/2019 | |
| CN | 110381526 A | | 10/2019 | |
| CN | 111264068 A | | 6/2020 | |
| CN | 111417189 A | | 7/2020 | |
| CN | 111867050 A | * | 10/2020 | ............. G01S 1/042 |
| WO | WO-2018111173 A1 | * | 6/2018 | ........... G01S 5/0236 |

* cited by examiner

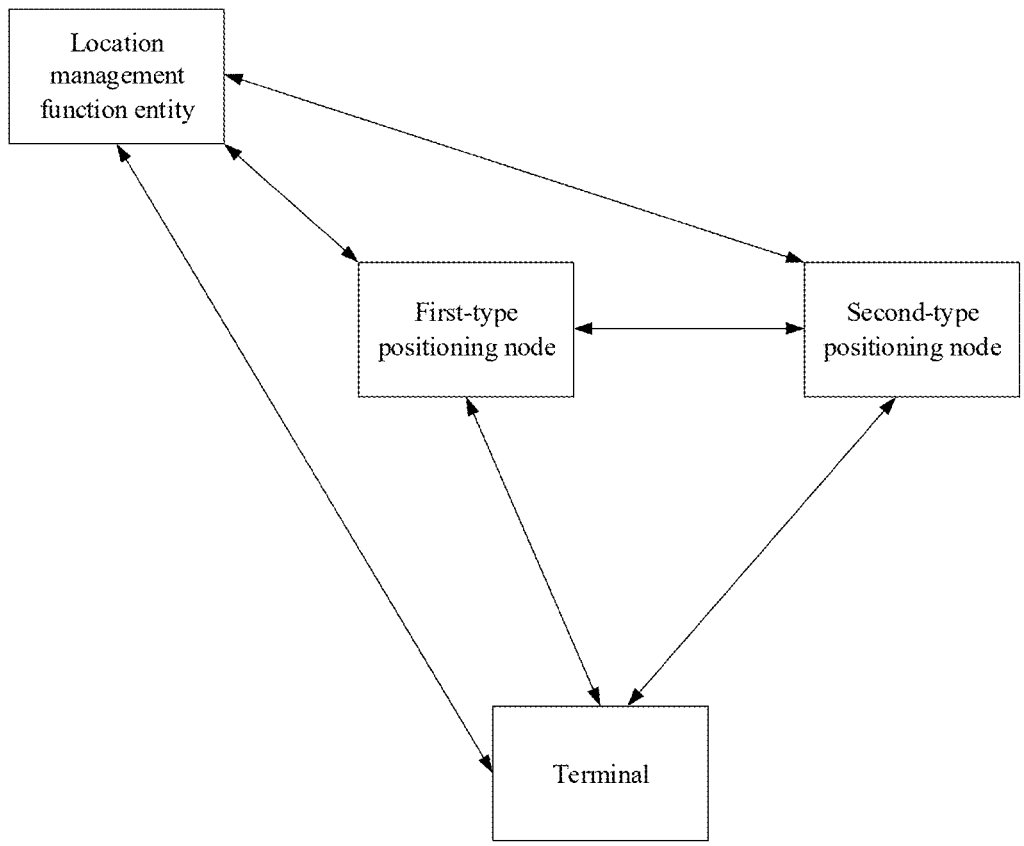

FIG. 1

Obtain first configuration information and second configuration information that are sent by a first-type positioning node or a location management function entity, where the first configuration information is used to instruct the terminal to transmit and/or receive a first positioning signal for performing positioning measurement with the first-type positioning node, and the second configuration information is used to instruct the terminal to transmit and/or receive a second positioning signal for performing positioning measurement with a second-type positioning node ⎯ S11

FIG. 2

POSITIONING MEASUREMENT METHOD, POSITIONING MEASUREMENT APPARATUS AND STORAGE MEDIUM

CROSS REFERENCE TO RELATED APPLICATION

The present disclosure is a U.S. National Stage of International Application No. PCT/CN2020/103871, filed on 23 Jul. 2020, the contents of all of which are incorporated herein by reference in their entireties for all purposes.

BACKGROUND

With the development of communication technologies, positioning measurement through wireless signals has been applied. A terminal and wireless network device that support a positioning function may more conveniently carry out a positioning measurement on a position of the terminal.

In order to realize positioning measurement, the terminal needs to transmit and/or receive reference signals for a positioning purpose with a plurality of the wireless network devices (such as base stations/transmission reception points (TRPs)). For the downlink, the terminal needs to receive and measure positioning reference signals (PRSs) sent by the plurality of base stations/TRPs. For the uplink, the terminal needs to send sounding reference signals (SRSs) to the plurality of base stations/TRPs

SUMMARY

The present disclosure provides a positioning measurement method, a positioning measurement apparatus and a storage medium.

According to a first aspect of the embodiments of the present disclosure, a positioning measurement method is provided and performed by a terminal, and includes:
obtaining first configuration information and second configuration information that are sent by a first-type positioning node or a location management function entity, where the first configuration information is used to instruct the terminal to transmit and/or receive a first positioning signal for performing positioning measurement with the first-type positioning node, and the second configuration information is used to instruct the terminal to transmit and/or receive a second positioning signal for performing positioning measurement with a second-type positioning node.

According to a second aspect of the embodiment of the present disclosure, a positioning measurement method is provided and performed by a network device, and includes:
sending first configuration information and second configuration information, where the first configuration information is used to instruct a terminal to transmit and/or receive a first positioning signal for performing positioning measurement with a first-type positioning node, and the second configuration information is used to instruct the terminal to transmit and/or receive a second positioning signal for performing positioning measurement with a second-type positioning node.

According to a third aspect of the examples of the present disclosure, a positioning measurement apparatus is provided, and includes:
a processor; and a memory for storing processor-executable instructions,
the processor is configured to: execute the positioning measurement method in the first aspect or in any implementation manner of the first aspect.

According to a fourth aspect of the examples of the present disclosure, a positioning measurement apparatus is provided, and includes:
a processor; and a memory for storing processor-executable instructions,
the processor is configured to: execute the positioning measurement method in the second aspect or in any implementation manner of the second aspect.

According to a fifth aspect of the examples of the present disclosure, a non-transitory computer-readable storage medium is provided, and when instructions in the storage medium are executed by the processor of a mobile terminal, the mobile terminal can execute the positioning measurement method in the first aspect or in any implementation manner of the first aspect.

According to a sixth aspect of the embodiments of the present disclosure, a non-transitory computer-readable storage medium is provided. When instructions stored in the storage medium are executed by a processor of a network device, the network device can execute the positioning measurement method described in the second aspect or in any one of implementation manners of the second aspect.

It should be understood that the above general description and the following detailed description are only illustrative and explanatory, and cannot limit the present disclosure.

BRIEF DESCRIPTION OF THE DRAWINGS

The accompanying drawings, which are incorporated in and constitute a part of this specification, illustrate the embodiments consistent with the present disclosure and, together with the specification, serve to explain the principles of the disclosure.

FIG. 1 is a system architecture diagram of joint positioning measurement according to an example;

FIG. 2 is a flowchart of a positioning measurement method according to an example;

DETAILED DESCRIPTION

Figure 3:
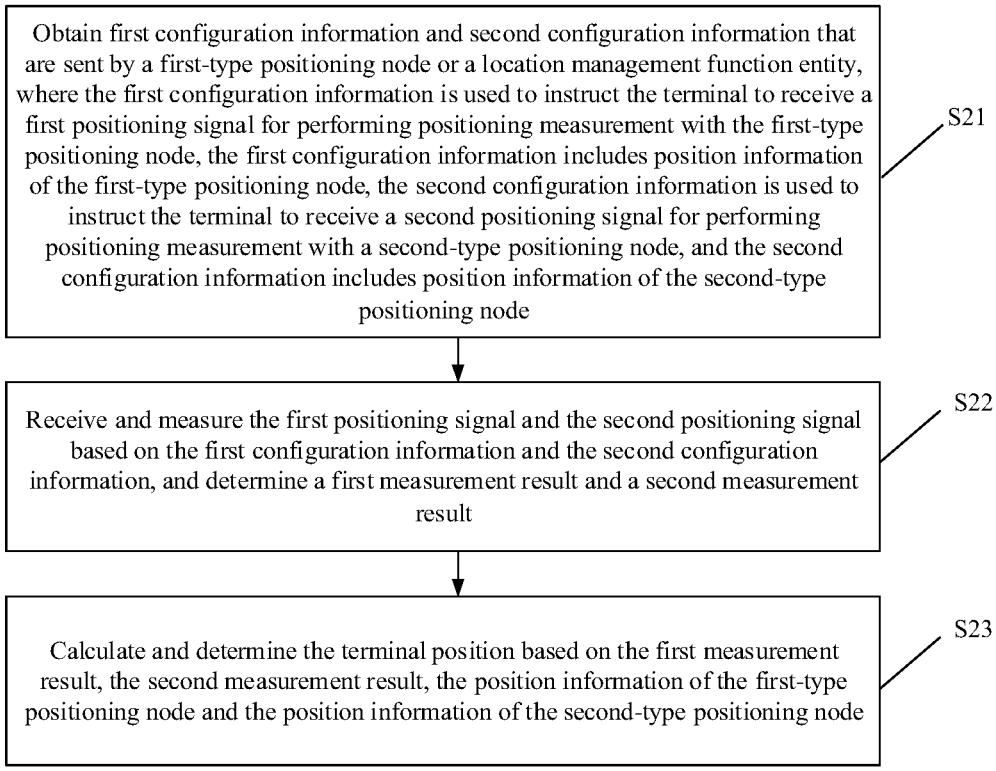
FIG. 3 is a flowchart of a positioning measurement method according to an example.

Embodiments will be described in detail here, and examples of which are shown in the accompanying drawings. When the following descriptions refer to the figures, the same numbers in different figures indicate the same or similar elements, unless otherwise indicated. The implementation manners described in the following examples do not represent all implementation manners consistent with the disclosure. Instead, the implementation manners are merely examples of apparatuses and methods consistent with some aspects of the present disclosure described as detailed in the appended claims.

The present disclosure relates to the technical field of communication, and particularly to a positioning measurement method, a positioning measurement apparatus, and a storage medium.

In the related art, a terminal communicates with a wireless access device, a core network device and other wireless network devices based on a cellular network, which may implement a positioning measurement function. For example, in NR Rel-16, positioning measurement for a terminal in a connected state is mainly discussed, and reference signals used for positioning are defined. The reference signals used for positioning may include, for example, PRSs used for downlink positioning and SRSs used for uplink positioning. The positioning measurement includes terminal measurement and wireless network device measurement. A measurement value includes a signal intensity measurement value, a signal transmission time value, and a channel arrival or departure angle value.

In order to realize positioning, the terminal needs to transmit and/or receive reference signals for a positioning purpose with a plurality of wireless network device (such as base stations/TRPs, etc.). In an example, in the case of downlink, the terminal needs to receive and measure PRSs sent by the plurality of base stations/TRPs. In the case of uplink, the terminal needs to send SRSs to the plurality of base stations/TRPs. The PRSs and SRSs occupy a large bandwidth and require high transmission power, so the power consumption of the terminal is influenced, and at the same time, other normal communication transmission and/or reception cannot be carried out while the positioning reference signals are sent, so that normal communication of a whole system is influenced.

In the related art, in addition to positioning by virtue of a cellular network, there are many other positioning methods, such as a positioning method based on wireless local area network terminals (WLAN terminals). Positioning based on the WLAN terminals mainly refers to the terminal transmits and/or receives reference signals for positioning with a plurality of the WLAN terminals, measures, and calculates based on measurement results and positions of the WLAN terminals, so as to obtain a position of the terminal. The WLAN terminal is close to the terminal, so if the terminal sends an uplink reference signal for positioning, the transmission power of the terminal does not need to be too high, such that the power consumption of the terminal can be reduced, interference to other terminals is reduced at the same time, and normal communication of other terminals may not be influenced.

In view of this, the embodiments of the present disclosure provide a positioning measurement method, in the positioning measurement method, the reference signals for the positioning purpose (hereinafter referred to as positioning signals) transmitted between the terminal and the different types of positioning nodes are combined, so that power consumption influence of positioning measurement carried out based on one type of positioning nodes purely is reduced, and communication performance of a communication system is improved.

It may be understood that, the positioning nodes involved in the embodiments of the present disclosure may also be called positioning device, network device, or wireless network device.

In an example, a positioning method combining a cellular network with a WLAN network is provided. For example, the terminal may transmit and/or receive reference signals for a positioning purpose by virtue of a base station/TRP and a plurality of WLAN terminals, measure, and calculate a position of the terminal according to measurement results and positions of the base station/TRP and the plurality of WLAN terminals, so that influence of positioning on the power consumption of the terminal, and influence on normal communication of a cellular network system are reduced.

The terminal involved in the present disclosure may also be called a terminal device, user equipment (UE), a mobile station (MS), a mobile terminal (MT), etc., and is a device that provides voice and/or data connectivity to users, for example, the terminal may be a handheld device with a wireless connection function, on-board device, Internet of Things (IoT) device, Industry Internet of Things (IIoT) device, etc. At present, for example, some terminals are: a mobile phone, a pocket personal computer (PPC), a palm computer, a personal digital assistant (PDA), a notebook computer, a tablet computer, a wearable device, a vehicle-mounted device, or the like. In addition, for an Internet of Vehicles (V2X) communication system, the terminal device may also be on-board device. It should be understood that, the examples of the present disclosure do not limit a specific technology and a specific device form which are used in the terminal.

In the examples of the present disclosure, for convenience of description, at least two types of positioning nodes among different types of positioning nodes (or device) used in joint positioning measurement are called the first-type positioning nodes and the second-type positioning nodes. The positioning signals transmitted for realizing positioning measurement through communication between the terminal and the first-type positioning nodes are called first positioning signals, and the positioning signals transmitted for realizing positioning measurement through communication between the terminal and the second-type positioning nodes are called second positioning signals.

In the examples of the present disclosure, the first-type positioning nodes and the second-type nodes communicate with the terminal, respectively by using different wireless access technologies. In an example, the first-type positioning nodes include wireless network device communicating based on a cellular network. For example, the first-type positioning nodes may include wireless access network device such as base stations, or include core network device such as location management function (LMF) entities. Further, the wireless access network device involved in the present disclosure may be: base stations, evolved nodes B (base stations), home base stations, access points (APs) in a wireless fidelity (WIFI) system, wireless relay nodes, wireless return nodes, transmission points (TPs) or transmission and reception points (TRPs), etc., and the first-type positioning nodes may also be gNB in a NR system, or components or part of device constituting base stations. It should be understood that specific technologies and specific device forms used in the network device are not limited in the embodiments of the present disclosure.

For a device-to-device communication (D2D) system and an Internet of Vehicles (V2X) communication system, the first-type positioning nodes may also be terminals, such as on-board device.

In the examples of the present disclosure, the second-type positioning nodes include wireless local area network device communicating based on a WLAN, or Bluetooth device based on Bluetooth communication, or UWB device based on ultra-wideband (UWB) communication. It may be understood that the second-type positioning nodes may also be sensors communicating based on one or more wireless communication technologies of WLAN, Bluetooth, and UWB.

The positioning measurement method provided in the examples of the present disclosure may be performed by a system architecture shown in FIG. 1. As shown in FIG. 1, the first positioning signals are transmitted between the terminal and the first-type positioning nodes, and the second positioning signals are transmitted between the terminal and the second-type positioning nodes. A communication interface is formed between the first-type positioning node and the second-type positioning node, that is, the first-type positioning node and the second-type positioning node may perform communication interaction with each other. In an example, a cellular network and a WLAN network are combined for positioning measurement, and an interface between the cellular network and the WLAN network is provided, that is, the cellular network and the WLAN network may communicate with each other and transmit information through the interface.

In one example of the present disclosure, the first-type positioning node and the second-type positioning node, respectively, communicate with the terminal by using different wireless access technologies.

In an implementation manner, the first-type positioning nodes include wireless network device communicating based on a cellular network. The second-type positioning nodes include one or more of a wireless local area network device, Bluetooth device and ultra-wideband positioning device. For example, the first-type positioning node is a base station/TRP, and the second-type positioning node includes one or more of a WLAN terminal, a Bluetooth node or a UWB node.

FIG. 2 is a flowchart of a positioning measurement method according to an example, and as shown in FIG. 2, the positioning measurement method is used in a terminal, and includes the following steps.

In step S11, the first configuration information and second configuration information that is sent by the first-type positioning node or the location management function entity are obtained.

In the embodiments of the present disclosure, the first configuration information and the second configuration information are both from the first-type positioning node or the location management function entity.

When the first configuration information and the second configuration information are both from the first-type positioning node, it may be understood that the first configuration information and the second configuration information are both from a first-type positioning node to which a serving cell of the terminal belongs.

The first configuration information is used to instruct the terminal to transmit and/or receive a first positioning signal for performing positioning measurement with the first-type positioning node. The second configuration information is used to instruct the terminal to transmit and/or receive a second positioning signal for performing positioning measurement with a second-type positioning node.

In one example of the embodiments of the present disclosure, the second configuration information may be sent to the first-type positioning node (including the first-type positioning node to which the serving cell of the terminal belongs) through an interface between the second-type positioning node and the first-type positioning node. The first-type positioning node may send the second configuration information to the location management function entity. In general, the second configuration information is obtained by the first-type positioning node to which the serving cell of the terminal belongs, and is sent to the location management function entity. in another example, the second configuration information may also be sent to the location management function entity through the interface between the second-type positioning node and the location management function entity. The location management function entity may send the second configuration information to the first-type position node (including the first-type positioning node to which a serving cell of the terminal belongs). That is, in the embodiments of the present disclosure, the second configuration information is sent by the second-type positioning node to the first-type positioning node and/or the location management function entity.

In the embodiments of the present disclosure, the first configuration information and the second configuration information may be combined with the first positioning signal transmitted between the terminal and the first-type positioning node and the second positioning signal transmitted between the terminal and the second-type positioning node for combined positioning measurement, so that the power consumption influence of positioning measurement purely based on one type positioning node can be reduced, and the communication performance of the communication system can be improved.

In an example, suppose a terminal originally needs to carry out transmission and/or reception and measurement of first positioning signals with H first-type positioning nodes to carry out positioning measurement, by applying the embodiments of the present disclosure, transmission and/or reception and measurement of the first positioning signals may be carried out between the terminal and M first-type positioning nodes, and transmission and/or reception and measurement of the second positioning signals may be carried out between the terminal and N first-type positioning nodes, where M+N=H. M is less than H, so by the combined positioning method provided by the embodiments of the present disclosure, compared with positioning measurement that is performed based on H first-type positioning nodes, positioning measurement that is performed based on M first-type positioning nodes can reduce the influence on the power consumption of the terminal by positioning during the positioning measurement that is performed based on the first-type positioning node, and can reduce the signaling overhead between the first-type positioning node and the terminal.

In the embodiments of the present disclosure, the positioning measurement method involved in the above examples is described below in combination with practical applications.

In the embodiments of the present disclosure, the first configuration information may be used to instruct to transmit and/or receive a first positioning signal used in uplink positioning measurement, and may also be used to instruct to transmit and/or receive a first positioning signal used in downlink positioning measurement, and/or, the second configuration information may be used to instruct to transmit and/or receive a second positioning signal used in uplink positioning measurement, and may also be used to instruct to transmit and/or receive a second positioning signal used in downlink positioning measurement.

In one implementation manner, the first configuration information is used to instruct a terminal to receive a first positioning signal, and/or the second configuration information is used to instruct the terminal to receive a second positioning signal, that is, implementing positioning measurement for the downlink.

In the embodiments of the present disclosure, the positioning measurement for the downlink may be performed by the terminal.

In the embodiments of the present disclosure, the terminal performs the positioning measurement according to the first configuration information and the second configuration information.

That the terminal performs positioning measurement according to the first configuration information and the second configuration information may be understood that transmission and/or reception and measurement are performed on the first positioning signal and the second positioning signal.

Positioning measurement of the terminal for the first configuration information and the second configuration information includes one or more of signal intensity measurement, time measurement and angle measurement. The measurement result includes one or more of a signal intensity measurement result, a time measurement result and an angle measurement result.

In an implementation manner, the terminal determines a first measurement result and a second measurement result. The first measurement result corresponds to a measurement result of measuring the first positioning signals. The second measurement result corresponds to the measurement result of measuring the second positioning signal.

Further, in the embodiments of the present disclosure, the position of the terminal may be determined through calculation of the terminal, or may be determined through calculation of the first-type positioning node, or may be determined through calculation of the second-type positioning node.

In one implementation manner of the embodiments of the present disclosure, when the terminal position is calculated and determined by the terminal, the terminal calculates and determines the terminal position based on the first measurement result and the second measurement result.

In the embodiments of the present disclosure, while calculating and determining the position of the terminal, the terminal needs to determine the position information of the first-type positioning nodes and the position information of the second-type positioning nodes, and calculate and determine the position of the terminal based on the first measurement result, the second measurement result, the position information of the first-type positioning nodes, and the position information of the second-type positioning nodes.

In the examples of the present disclosure, the position information of the first-type positioning nodes may be included in the first configuration information. And/or, the position information of the second-type positioning nodes may be included in the second configuration information.

FIG. 3 is a flowchart of a positioning measurement method according to an example, and as shown in FIG. 3, the positioning measurement method is used in a terminal, and includes the following steps.

In step S21, the first configuration information and second configuration information that are sent by the first-type positioning node or the location management function entity are obtained.

The first configuration information is used to instruct the terminal to receive a first positioning signal for performing positioning measurement with the first-type positioning node. The first configuration information includes the position information of the first-type positioning node. The second configuration information is used to instruct the terminal to receive a second positioning signal for performing positioning measurement with the second-type positioning node. The second configuration information includes the position information of the second-type positioning node.

The first configuration information and the second configuration information are obtained from the first-type positioning node or the location management function entity. When the first configuration information and/or the second configuration information are/is obtained from the first-type positioning node. It may be understood that the first configuration information and/or the second measurement result are/is obtained from the first-type positioning node to which the serving cell of the terminal belongs.

In step S22, the first positioning signal and the second positioning signal are received and measured based on the first configuration information and the second configuration information, and the first measurement result and the second measurement result are determined.

In step S23, the position of the terminal is calculated and determined based on the first measurement result, the second measurement result, the position information of the first-type positioning nodes, and the position information of the second-type positioning nodes.

In another implementation manner, the terminal in the embodiments of the present disclosure may send the first positioning measurement result and the second positioning measurement result to the first-type positioning nodes and/or the location management function entities, and the position of the terminal is determined by the first-type positioning nodes and/or the location management function entities.

Figure 4:
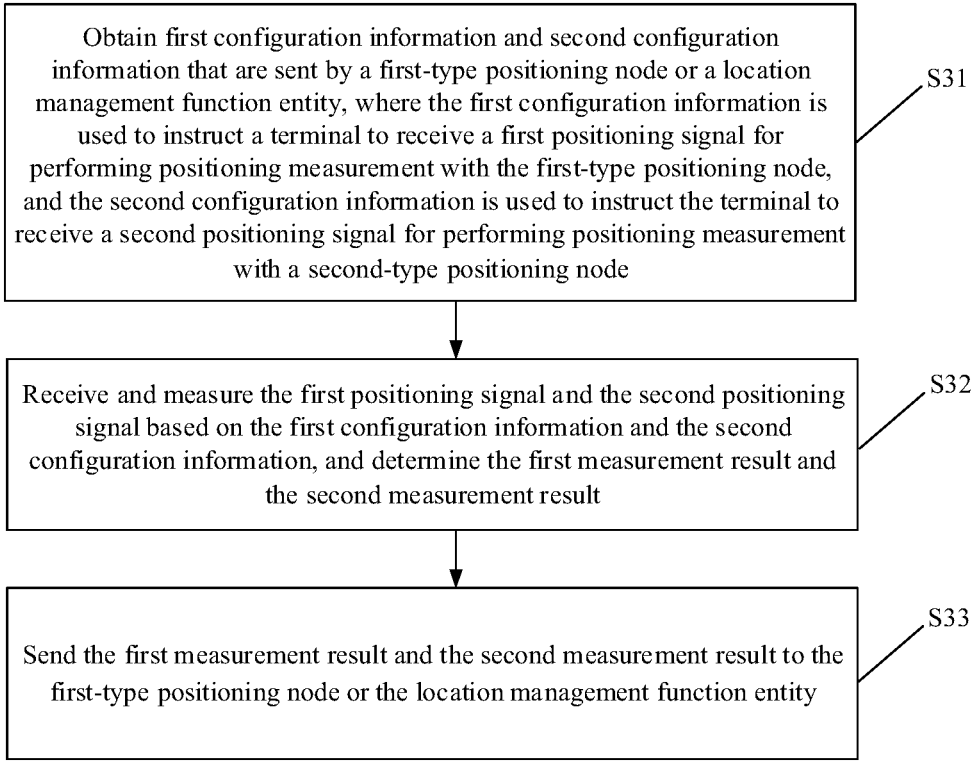
FIG. 4 is a flowchart of a positioning measurement method according to an example.

FIG. 4 is a flowchart of a positioning measurement method according to an example, and as shown in FIG. 4, the positioning measurement method is used in a terminal, and includes the following steps.

In step S31, the first configuration information and second configuration information are obtained.

The first configuration information is used to instruct the terminal to receive a first positioning signal for performing positioning measurement with the first-type positioning node. The second configuration information is used to instruct the terminal to receive a second positioning signal for performing positioning measurement with a second-type positioning node.

The first configuration information and the second configuration information are obtained from the first-type positioning node or the location management function entity. When the first configuration information and/or the second configuration information are/is obtained from the first-type positioning node. It may be understood that the first configuration information and/or the second measurement result are/is obtained from the first-type positioning node to which the serving cell of the terminal belongs.

In step S32, the first positioning signal and the second positioning signal are received and measured based on the first configuration information and the second configuration information, and the first measurement result and the second measurement result are determined.

In step S33, the first measurement result and the second measurement result are sent to the first-type positioning node or the location management function entity.

In the embodiments of the present disclosure, the first measurement result and the second measurement result are sent to the first-type positioning node or the location management function entity. The first-type positioning node or the location management function entity obtains the first measurement result, the second measurement result and the position information of the second-type positioning node, and calculates and determines the terminal position based on the first measurement result, the second measurement result, the position information of the first-type positioning node and the position information of the second-type positioning node.

The terminal sending the first measurement result and the second measurement result to the first-type positioning nodes may be understood as sending to the first-type positioning nodes to which a service cell of the terminal belongs.

After the first-type positioning node or the location management function entity calculates and determines the terminal position, terminal position information that represents the determined terminal position may be sent to the terminal.

Figure 5:
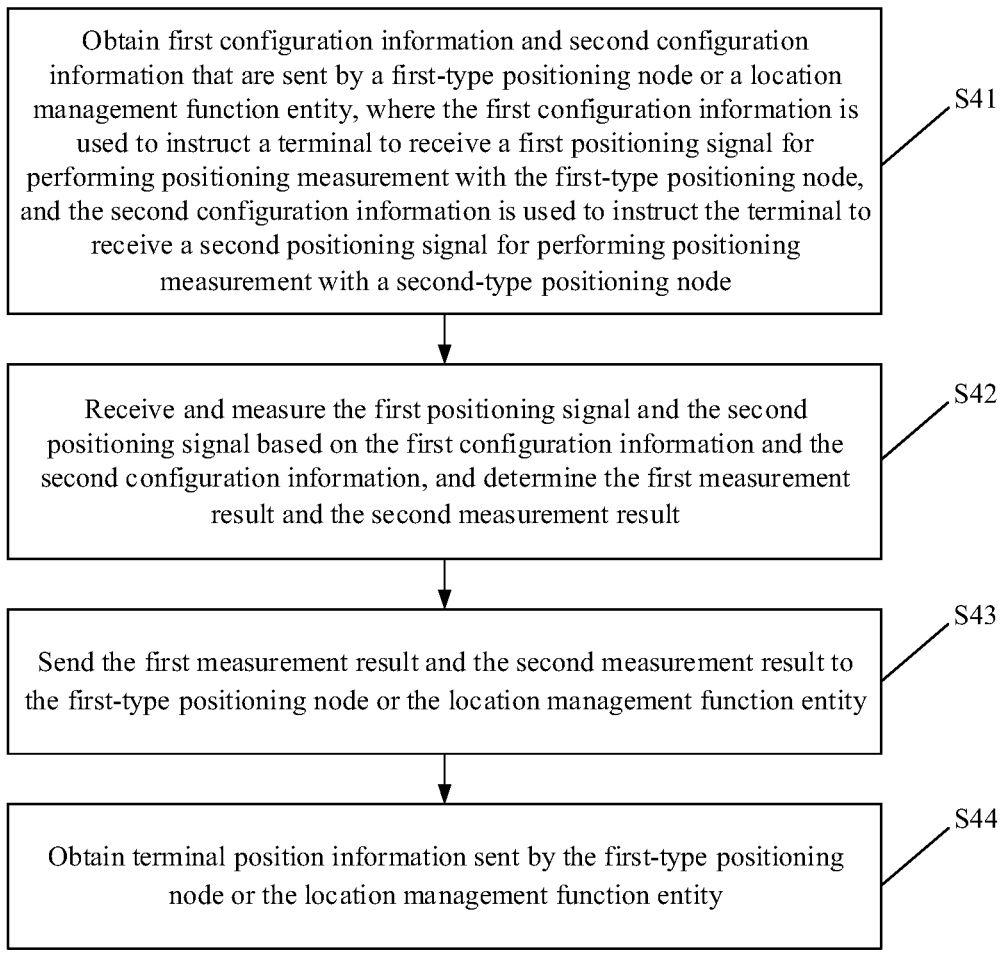
FIG. 5 is a flowchart of a positioning measurement method according to an example.

FIG. 5 is a flowchart of a positioning measurement method according to an example. As shown in FIG. 5, the positioning measurement method is used in the terminal. Step S41, step S42 and step S43 in FIG. 5 are the same as step S31, step S32 and step S33 in FIG. 4, which are not described in detail in the embodiments of the present disclosure.

In step S44, the terminal position information sent by the first-type positioning node or the location management function entity is obtained.

In one implementation manner of the embodiments of the present disclosure, the terminal position information is determined by the first-type positioning node or the location management function entity based on the first measurement result, the second measurement result, the position information of the first-type positioning node and the position information of the second-type positioning node. The position information of the second-type positioning node is sent by the second-type positioning node to the first-type positioning node or the location management function entity.

obtaining the terminal position information sent by the first-type positioning node may be understood that the terminal position information is obtained from the first-type positioning node to which the serving cell of the terminal belongs.

The first measurement result and/or the second measurement result are/is determined and reported by the terminal. The first measurement result corresponds to the measurement result of measuring the first positioning signal, the second measurement result corresponds to the measurement result of measuring the second positioning signal, and the measurement result includes one or more of a signal intensity measurement result, a time measurement result and an angle measurement result.

In another implementation manner of the embodiments of the present disclosure, the terminal position information is determined by the first-type positioning node or the location management function entity based on the terminal position information sent by the second-type positioning node, where the terminal position information sent by the second-type positioning node is a terminal position within a specified time obtained by the positioning of the second-type positioning node.

If the second-type positioning node determines the position of the terminal, for example, the terminal position is obtained through positioning, the second-type positioning node may send the determined terminal position to the first-type positioning node or the location management function entity. The first-type positioning node or the location management function entity determines the terminal position information based on the terminal position information sent by the second-type positioning node.

The terminal position information sent by the second-type positioning node may be a terminal position within a specified time T obtained by the positioning of the second-type positioning node. For example, if the second-type positioning node has the terminal position information obtained through positioning within the time T, the second-type positioning node may send the terminal position information obtained through positioning within the time T to the first-type positioning node or the location management function entity.

It may be understood that when the second-type positioning node sends the terminal position information to the first-type positioning node or the location management function entity, information of the specified time T may be included.

In the embodiments of the present disclosure, the second-type positioning node may send the terminal position information to the first-type positioning node or the location management function entity together with the second configuration information, or may singly send the terminal position information to the first-type positioning node or the location management function entity.

In one implementation manner, the terminal position information, and/or the specified time, and/or the second configuration information are sent by the second-type positioning node based on a received positioning resource configuration information request. The positioning resource configuration information request is sent by the first-type positioning node and/or the location management function entity.

In another implementation manner of the embodiments of the present disclosure, the first configuration information is used to instruct a terminal to send a first positioning signal, and/or the second configuration information is used to instruct the terminal to send a second positioning signal, that is, implementing positioning measurement for the uplink.

In the embodiments of the present disclosure, the positioning measurement for the uplink may be performed by the first-type positioning node and/or the second-type positioning node. The first measurement result is determined by the first-type positioning node. The first-type positioning node receives the first positioning signal sent by the terminal according to the first configuration information, and performs measurement to obtain a first measurement result, where the measurement includes at least one of signal intensity measurement, time measurement or angle measurement. The second measurement result is determined by second-type positioning node. The second-type positioning node receives the second positioning signal sent by the terminal according to the second configuration information, and performs measurement to obtain a second measurement result, where the measurement includes at least one of signal intensity measurement, time measurement or angle measurement.

In the embodiments of the present disclosure, the second-type positioning node may send the determined second measurement result to the first-type positioning node or the location management function entity. The first-type positioning node or the location management function entity calculates and determines the position of the terminal based on the first measurement result and the second measurement result.

When the first-type positioning nodes or the location management function entities calculate and determine the position of the terminal, the position information of the second-type positioning nodes further needs to be obtained. The terminal position is calculated and determined based on the first measurement result, the second measurement result, the position information of the first-type positioning node and the position information of the second-type positioning node.

When the first-type positioning node obtains the position information of the second-type positioning node, it may be understood that the first-type positioning node to which the serving cell of the terminal belongs obtains the position information of the second-type positioning node.

In the embodiments of the present disclosure, the position information of the second-type positioning node may be included in the second configuration information. In one implementation manner, the second configuration information and the second measurement result may be sent by the second-type positioning node together to the first-type positioning node or the location management function entity, or may be singly sent to the first-type positioning node or the location management function entity.

In the embodiments of the present disclosure, for the uplink positioning measurement, the first-type positioning node or the location management function entity may calculate and determine the terminal position information based on the terminal position information sent by the second-type positioning node, where the terminal position information sent by the second-type positioning node is the terminal position within the specified time obtained by the positioning of the second-type positioning node.

The determining and sending process of the terminal position information sent by the second-type positioning node may refer to the related description in the above embodiments, which is not described here.

In the embodiments of the present disclosure, after the first-type positioning node or the location management function entity calculates and determines the terminal position, the terminal position information may be sent to the terminal.

Figure 6:
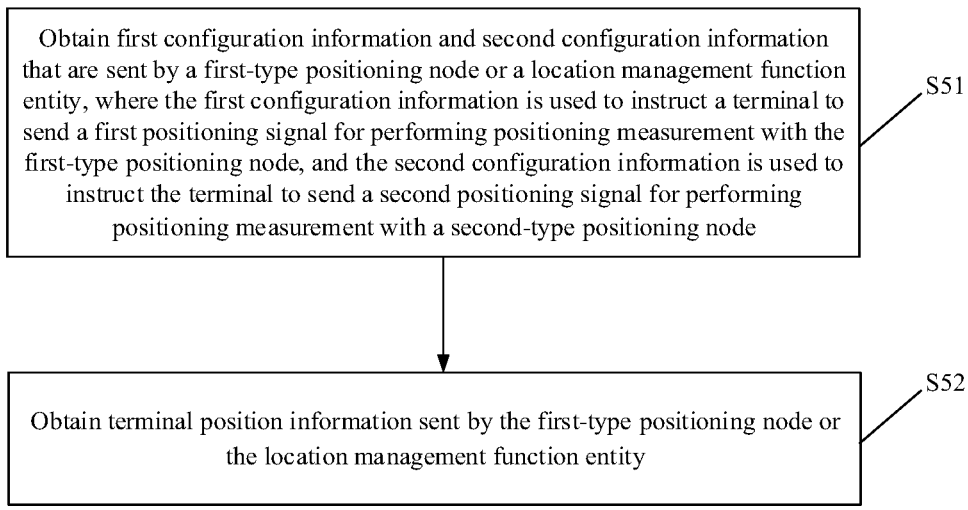
FIG. 6 is a flowchart of a positioning measurement method according to an example.

FIG. 6 is a flowchart of a positioning measurement method according to an example. As shown in FIG. 6, the positioning measurement method may be used in a terminal, and includes the following steps:

In step S51, the first configuration information and second configuration information that are sent by the first-type positioning node or the location management function entity are obtained.

The first configuration information is used to instruct the terminal to send a first positioning signal for performing positioning measurement with the first-type positioning node, and the second configuration information is used to instruct the terminal to send a second positioning signal for performing positioning measurement with a second-type positioning node.

In step S52, the terminal position information sent by the first-type positioning node or the location management function entity is obtained.

In one implementation manner, the terminal position information is determined by the first-type positioning node or the location management function entity based on the first measurement result, the second measurement result, the position information of the first-type positioning node and the position information of the second-type positioning node. The first measurement result and/or the second measurement result are/is determined and reported by the terminal, or the first measurement result and/or the second measurement result are/is determined by the first-type positioning node and/or the second-type positioning node.

In another implementation manner, the terminal position information is determined by the first-type positioning node or the location management function entity based on the terminal position information sent by the second-type positioning node. The terminal position information sent by the second-type positioning node is the terminal position within the specified time obtained through the positioning of the second-type positioning node.

The positioning measurement method which the embodiments of the present invention relates to is described mainly for a terminal side. The process of performing the positioning measurement method at the network device side is described below.

Figure 7:
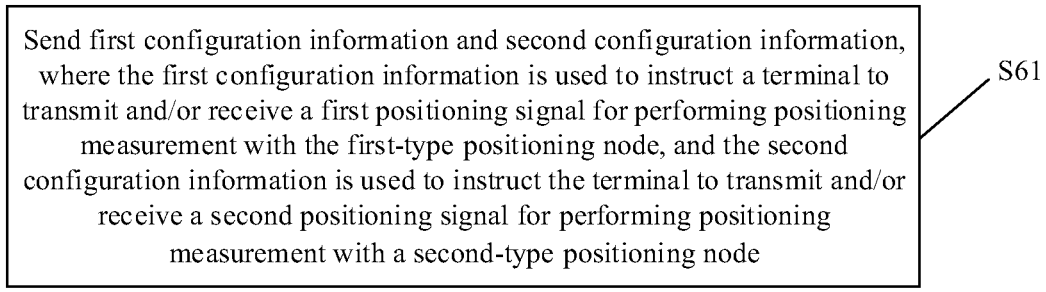
FIG. 7 is a flowchart of a positioning measurement method according to an example.

FIG. 7 is a flowchart of a positioning measurement method according to an example. As shown in FIG. 7, the positioning measurement method is used in a network device. The network device may be a first-type positioning node, or may be a location management function entity. The positioning measurement method includes the following steps.

In step S61, the first configuration information and second configuration information are sent.

The first configuration information is used to instruct the terminal to transmit and/or receive a first positioning signal for performing positioning measurement with the first-type positioning node. The second configuration information is used to instruct the terminal to transmit and/or receive a second positioning signal for performing positioning measurement with a second-type positioning node.

The first-type positioning node sends the first configuration information and the second configuration information may be understood that the first-type positioning node to which the serving cell of the terminal belongs sends the first configuration information and the second configuration information.

In one implementation manner, the first configuration information is used to instruct a terminal to receive a first positioning signal, and the second configuration information is used to instruct the terminal to receive a second positioning signal, such that positioning measurement for the downlink is implemented.

In the embodiments of the present disclosure, for the downlink positioning measurement, the network device may obtain the first measurement result and/or the second measurement result that are/is determined and reported by the terminal to calculate and determine the terminal position.

Further, when the network device calculates and determines the terminal position, it is necessary to obtain the position information of the second-type positioning node.

Figure 8:
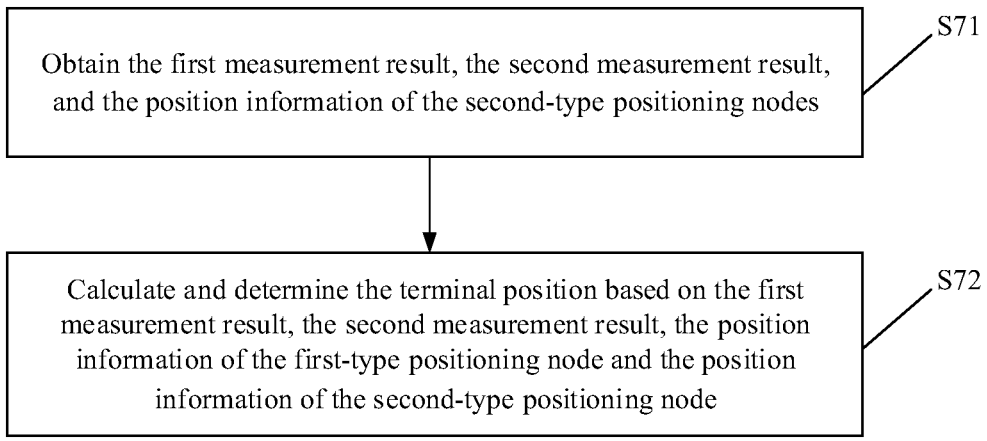
FIG. 8 is a flowchart of a positioning measurement method according to an example.

FIG. 8 is a flowchart of a positioning measurement method according to an example. As shown in FIG. 8, the positioning measurement method is used in the network device, the network device may be first-type positioning nodes or location management function entities, and the positioning measurement method includes the following steps.

In step S71, a first measurement result, a second measurement result, and position information of the second-type positioning nodes are obtained.

In the embodiments of the present disclosure, the position information of the second-type positioning node may be sent to the first-type positioning node through an interface between the second-type positioning node and the first-type positioning node. The first-type positioning node may send the position information of the second-type positioning node to the location management function entity. In another example, the position information of the second-type positioning node may also be sent to the location management function entity through an interface between the second-type positioning node and the location management function entity. The location management function entity may send the position information of the second-type positioning node to the first-type positioning node. That is, in the embodiments of the present disclosure, the position information of the second-type positioning node is sent by the second-type positioning node to the first-type positioning node and/or the location management function entity.

In the embodiments of the present disclosure, the position information of the second-type positioning node may be born in the second configuration information.

That the first-type positioning node obtains the first measurement result, the second measurement result and the position information of the second-type positioning node refers to that the first-type positioning node to which a serving cell of terminal belongs obtains the first measurement result, the second measurement result and the position information of the second-type positioning node.

In step S72, the position of the terminal is calculated and determined based on the first measurement result, the second measurement result, the position information of the first-type positioning nodes, and the position information of the second-type positioning nodes.

In the embodiments of the present disclosure, if the network device is the first-type positioning node, when the location management function entity calculates and determines the terminal position, the first-type positioning node obtains the first measurement result and the second measurement result, and sends the obtained first measurement result and second measurement result to the location management function entity. The location management function entity calculates and determines the terminal position based on the first measurement result, the second measurement result, the position information of the first-type positioning node and the position information of the second-type positioning node. The location management function entity may obtain the position information of the second-type positioning node directly from the second-type positioning node, or the first-type positioning node may obtain the position information of the second-type positioning node, and the first-type positioning node sends the position information of the second-type positioning node to the location management function entity.

Further, in the embodiments of the present disclosure, after the first-type positioning node or the location management function entity calculates and determines the terminal position, the terminal position information representing the calculated and determined terminal position may be sent to the terminal.

In another implementation manner of the embodiments of the present disclosure, the first configuration information is used to instruct the terminal to send the first positioning signal, and the second configuration information is used to instruct the terminal to send the second positioning signal, thereby implementing positioning measurement for the uplink.

Figure 9:
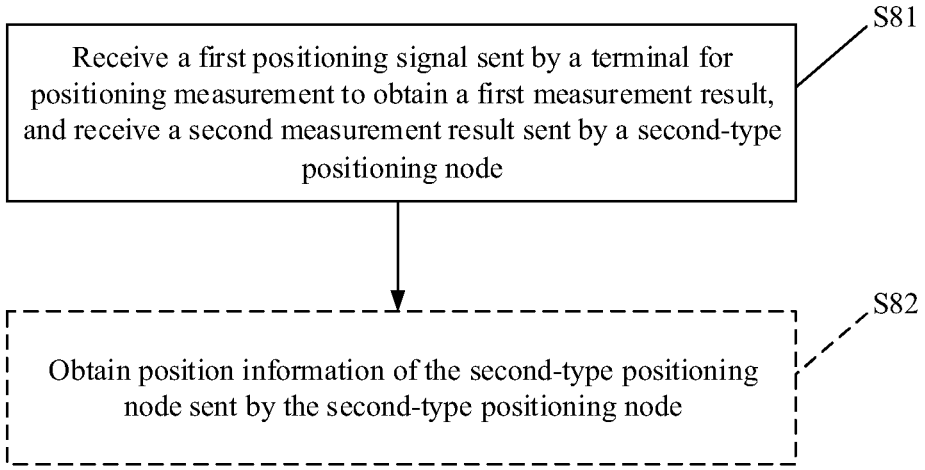
FIG. 9 is a flowchart of a positioning measurement method according to an example.

FIG. 9 is a flowchart of a positioning measurement method according to an example. As shown in FIG. 9, the positioning measurement method is performed by a network device and includes the following steps:

In step S81, the first-type positioning node receives a first positioning signal sent by the terminal for positioning measurement to obtain a first measurement result, and receives a second measurement result sent by the second-type positioning node.

In the embodiments of the present disclosure, the positioning measurement for the uplink may be performed by the first-type positioning node and/or the second-type positioning node. The first measurement result is determined by the first-type positioning node. The first-type positioning node receives the first positioning signal sent by the terminal according to the first configuration information, and performs measurement to obtain a first measurement result, where the measurement includes at least one of signal intensity measurement, time measurement or angle measurement.

The second measurement result is determined by the second-type positioning node. The second-type positioning node receives the second positioning signal sent by the terminal according to the second configuration information, and performs measurement to obtain a second measurement result, where the measurement includes at least one of signal intensity measurement, time measurement or angle measurement.

In the embodiments of the present disclosure, the second-type positioning node may send the determined second measurement result to the first-type positioning node and/or the location management function entity.

Further, for the uplink positioning measurement, the first-type positioning node or the location management function entity may determine the terminal position.

Further, in FIG. 9, the method may further include the following step S82.

In step S82, the position information of the second-type positioning node sent by the second-type positioning node is obtained.

The first-type positioning node or the location management function entity may obtain the position information of the second-type positioning node sent by the second-type positioning node through the second configuration information.

Further, in the embodiments of the present disclosure, the network device may calculate and determine the position of the terminal based on the first measurement result, the second measurement result, the position information of the first-type positioning node and the position information of the second-type positioning node.

In the embodiments of the present disclosure, after the network device calculates and determines the position of the terminal, the terminal position information representing the calculated and determined terminal position may be sent to the terminal.

In another implementation manner of the embodiments of the present disclosure, the terminal position information is determined by the first-type positioning node or the location management function entity based on the terminal position information sent by the second-type positioning node. The terminal position information sent by the second-type positioning node is the terminal position within the specified time obtained through the positioning of the second-type positioning node.

Figure 10:
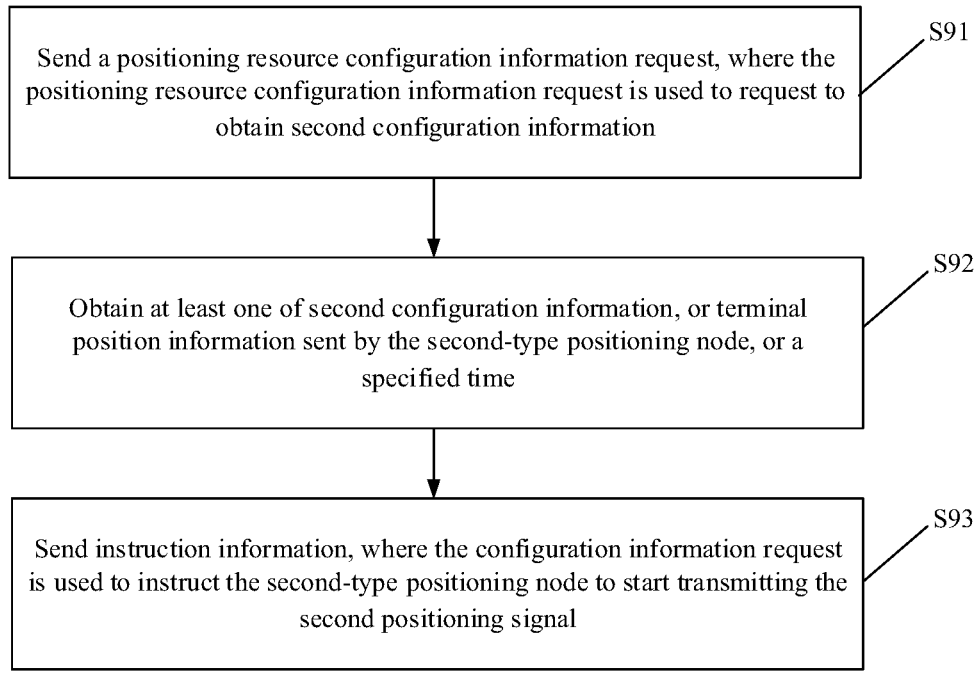
FIG. 10 is a flowchart of a positioning measurement method according to an example.

FIG. 10 is a flowchart of a positioning measurement method according to an example. As shown in FIG. 10, the positioning measurement method is performed by a network device. The network device may be a first-type positioning node or a location management function entity. The positioning measurement method includes the following steps:

In step S91, a positioning resource configuration information request is sent, where the positioning resource configuration information request is used to request to obtain the second configuration information.

In one implementation manner, the first-type positioning node and/or the location management function entity may send the positioning resource configuration information request to the second-type positioning node. After the second-type positioning node receives the positioning resource configuration information request sent by the first-type positioning node and/or the location management function entity, the terminal position information, and/or the specified time, and/or the second configuration information are sent based on the received positioning resource configuration information request.

In step S92, the second configuration information, and/or the terminal position information sent by the second-type positioning node, and/or the specified time are obtained.

If the second-type positioning node determines the position of the terminal, for example, the terminal position is obtained through positioning, the second-type positioning node may send the determined terminal position to the first-type positioning node or the location management function entity. The first-type positioning node or the location management function entity obtains the terminal position information sent by the second-type positioning node, and the terminal position information is determined based on the terminal position information sent by the second-type positioning node.

The terminal position information sent by the second-type positioning node may be a terminal position within a specified time T obtained through the positioning of the second-type positioning node. For example, if the second-type positioning node has the terminal position information obtained through positioning within the time T, the second-type positioning node may send the terminal position information obtained through positioning within the time T to the first-type positioning node or the location management function entity.

It may be understood that in the embodiments of the present disclosure, when the first-type positioning node or the location management function entity receives the terminal position information sent by the second-type positioning node, the information of the specified time T may further be included.

In the embodiments of the present disclosure, the second-type positioning node may send the terminal position information to the first-type positioning node or the location management function entity together with the second configuration information, or may singly send the terminal position information to the first-type positioning node or the location management function entity. The first-type positioning node or the location management function entity receives the second configuration information and/or the terminal position information sent by the second-type positioning node.

The first-type positioning node and/or the location management function entity obtains the second configuration information, and/or the terminal position information sent by the second-type positioning node, and/or the specified time.

Further, in the embodiments of the present disclosure, the first-type positioning node or the location management function entity may further send instruction information, where the instruction information is used to instruct the second-type positioning node to start transmitting the second positioning signal, so as to facilitate subsequent positioning measurement.

In step S93, the instruction information is sent, where the instruction information is used to instruct the second-type positioning node to start transmitting the second positioning signal.

It may be understood that the performing order of the steps S91, S92 and S93 in the embodiments of the present disclosure is not limited, and one or more steps are optional.

According to the positioning measurement method provided by the embodiments of the present disclosure, the positioning signal may be transmitted and/or received based on the first configuration information and the second configuration, so that the first-type positioning node and the second-type positioning node are combined for positioning measurement, the power consumption influence of positioning measurement purely based on one type positioning node can be reduced, and the communication performance of the communication system can be improved.

According to the embodiments of the present disclosure, the above positioning measurement method is illustratively described below by taking the case where the first-type positioning node includes a base station/TRP and the second-type positioning node includes a WLAN terminal as an example. According to the embodiments of the present disclosure, an interface between the cellular network and WLAN is provided, that is, information may be transmitted between the cellular network and WLAN through the interface. Accordingly, when the combined positioning method is implemented, on the one hand, a terminal measurement method may be included, and on the other hand, a base station/WLAN terminal measurement method may also be included.

Firstly, the terminal measurement method is described. The terminal measurement method includes the following processes:

1. The terminal receives the first configuration information and second configuration information.

The first configuration information is used to configure the transmission and measurement of a first positioning signal (PRS and/or SRS) between the terminal and the base station/TRP (which may be M base stations/TRPs). The second configuration information is used to configure the transmission and measurement of a second positioning signal (a beacon of WLAN) between the terminal and the WLAN terminal (which may be N WLAN terminals).

Both the first configuration information and the second configuration information are from LMF and/or the base station.

2. The LMF and/or the base station obtains the second configuration information.

If the second configuration information is sent by the LMF, the second configuration information may also be sent by the WLAN to the base station through the interface between the WLAN and the base station, and then is sent by the base station to the LMF.

i. Before the second configuration information is obtained, the method may further include that: the LMF requests the WLAN through the base station for resource configuration information that can be used to perform positioning with the terminal, and then the WLAN replies to the resource configuration information.

a) In one manner, when the WLAN receives a positioning resource configuration information request from the base station, if the WLAN just has terminal position information obtained through positioning within a time T, the WLAN may directly feed the terminal position information back to LMF and/or the base station through the interface between the WLAN and the base station and/or the LMF. The information that is sent to the LMF and/or the base station together with the terminal position information may further include a value of the time T, and/or the second configuration information.

ii. After the second configuration information is obtained, the method may further include that: the LMF and/or the base station sends instruction information to instruct the WLAN to start transmission of a positioning purpose reference signal in the configuration information.

3. The terminal performs transmission and/or reception and measurement on the first positioning signal and the second positioning signal according to the configuration information, where the measurement includes at least one of signal intensity measurement, time measurement or angle measurement.

4. The terminal obtains a first measurement result with the base stations/TRPs, and obtains a second measurement result with the WLAN terminals.

5. A position of the terminal is calculated.

i. If the terminal calculates the position of the terminal, the first configuration information further needs to include position information of the base stations/TRPs, and the second configuration information further needs to include position information of the WLAN terminals. The terminal calculates the position of the terminal based on the first measurement result, the second measurement result, the position information of the base stations/TRPs, and the position information of the WLAN terminals.

ii. If the base station or the LMF calculates the terminal position, the terminal reports the first measurement result and the second measurement result to the base station or the LMF. The WLAN terminal sends its own position information to the base station and/or the LMF through the interface between the WLAN terminal and the base station and/or the LMF. In one manner, if the LMF calculates the terminal position, the WLAN terminal sends its own position information to the base station through the interface between the WLAN terminal and the base station, and the base station further needs to report its own position information and the position information of the WLAN terminal to the LMF.

Further, after the base station or the LMF calculates the terminal position, the calculated terminal position may further be fed back to the terminal.

Secondly, the base station measurement method is described. The base station measurement method includes the following processes:

1. The LMF and the base station send the first configuration information and the second configuration information. The first configuration information is used to configure the transmission and measurement of a first positioning signal (PRS and/or SRS) between the terminal and the base station/TRP (which may be M base stations/TRPs). The second configuration information is used to configure the transmission and measurement of a second positioning signal (a beacon of WLAN) between the terminal and the WLAN terminal (which may be N WLAN terminals).

2. The base station and/or the LMF obtains the second configuration information.

If the second configuration information is sent by the LMF, and the second configuration information is sent by the WLAN to the base station through the interface between the WLAN and the base station, the second configuration information that is sent by the WLAN to the base station through the interface between the WLAN and the base station is obtained by the base station, and then is sent to the LMF.

i. Before the second configuration information is obtained, the method may further include that: the LMF requests the WLAN through the base station for resource configuration information that can be used to perform positioning with the terminal, and then the WLAN replies to the resource configuration information.

a) In one manner, when the WLAN receives a positioning resource configuration information request from the base station, if the WLAN just has terminal position information obtained through positioning within a time T, the WLAN may directly feed the terminal position information back to LMF and/or the base station through the interface between the WLAN and the base station and/or the LMF. The information that is sent to the LMF and/or the base station together with the terminal position information may further include a value of the time T, and/or the second configuration information.

ii. After the second configuration information is obtained, the method may further include that: the LMF and/or the base station sends instruction information to instruct the WLAN to start transmission of a positioning purpose reference signal in the configuration information.

3. The base station receives the first positioning signal sent by the terminal according to the first configuration information, and performs measurement to obtain a first measurement result, where the measurement includes at least one of signal intensity measurement, time measurement or angle measurement.

4. The WLAN terminal receives the second positioning signal sent by the terminal according to the second configuration information, and performs measurement to obtain a second measurement result, where the measurement includes at least one of signal intensity measurement, time measurement or angle measurement.

5. The WLAN terminal sends the second measurement result to the base station through the interface between the WLAN terminal and the base station. If the second configuration information already includes the position information of the WLAN terminal, the second measurement result does not need to be sent; otherwise, the position information of the WLAN terminal and the second measurement result may be sent to the base station together.

6. A position of the terminal is calculated.

i. For the situation that the base station calculates the terminal position, the base station determines the position of the terminal based on the first measurement result, the second measurement result, the position information of the base station and the position information of the WLAN, and the terminal position may further be fed back to the terminal.

ii. If the LMF calculates the terminal position, the base station further needs to report the first measurement result, the second measurement result, the position information of the base station and the position information of the WLAN to the LMF. The LMF determines the position of the terminal based on the first measurement result, the second measurement result, the position information of the base station and the position information of the WLAN.

Further, the LMF may feed the calculated terminal position back to the terminal.

On the basis of the same concept, the embodiments of the present disclosure further provide a positioning measurement apparatus.

It may be understood that, in order to realize the above functions, the positioning measurement apparatus provided by the examples of the present disclosure includes corresponding hardware structures and/or software modules for executing the functions. In combination with the units and algorithmic steps of each example disclosed in the examples of the present disclosure, the examples of the present disclosure can be realized in the form of hardware or a combination of hardware and computer software. Whether a function is executed by means of hardware or computer software driving hardware depends on specific applications and design constraints of the technical solution. Those skilled in the art may use different methods for each specific application to realize the described functions, but such realization should not be considered beyond the scope of the technical solution of the examples of the present disclosure.

Figure 11:
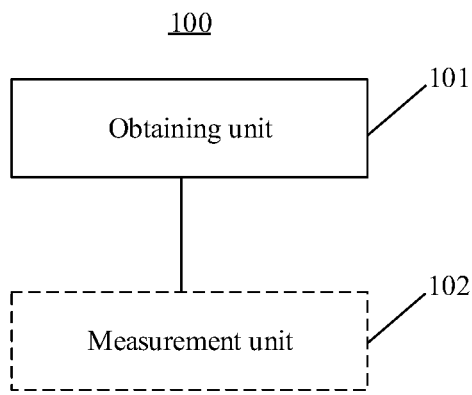
FIG. 11 is a block diagram of a positioning measurement apparatus according to an example.

FIG. 11 is a block diagram of a positioning measurement apparatus according to an example. Referring to FIG. 11, the positioning measurement apparatus 100 is performed by a terminal and includes an obtaining unit 101.

The obtaining unit 101 is configured to obtain the first configuration information and second configuration information that are sent by a first-type positioning node or a location management function entity, where the first configuration information is used to instruct a terminal to transmit and/or receive a first positioning signal for performing positioning measurement with the first-type positioning node, and the second configuration information is used to instruct the terminal to transmit and/or receive a second positioning signal for performing positioning measurement with a second-type positioning node.

In one implementation manner, the first configuration information is used to instruct the terminal to receive the first positioning signal, and/or the second configuration information is used to instruct the terminal to receive the second positioning signal.

In one implementation manner, the positioning measurement apparatus 100 further includes a measurement unit 102, where the measurement unit 102 performs positioning measurement based on the first configuration information and the second configuration information.

In one implementation manner, the first configuration information includes the position information of the first-type positioning node, and the second configuration information includes the position information of the second-type positioning node. The measurement unit 102 is configured to:

determine a first measurement result and a second measurement result, where the first measurement result corresponds to the measurement result of measuring the first positioning signal, the second measurement result corresponds to the measurement result of measuring the second positioning signal, and the measurement result includes one or more of a signal intensity measurement result, a time measurement result or an angle measurement result.

In one implementation manner, the measurement unit 102 calculates and determines a terminal position based on the first measurement result, the second measurement result, the position information of the first-type positioning node and the position information of the second-type positioning node.

In one implementation manner, the first configuration information is used to instruct the terminal to send the first positioning signal, and the second configuration information is used to instruct the terminal to second the second positioning signal.

In one implementation manner, the obtaining unit 101 is further configured to: obtain terminal position information sent by the first-type positioning node or the location management function entity.

In one implementation manner, the terminal position information is determined by the first-type positioning node or the location management function entity based on the first measurement result, the second measurement result, the position information of the first-type positioning node and the position information of the second-type positioning node; and the position information of the second-type positioning node is sent to the first-type positioning node or the location management function entity by the second-type positioning node, where the first measurement result corresponds to the measurement result of measuring the first positioning signal, the second measurement result corresponds to the measurement result of measuring the second positioning signal, and the measurement result includes one or more of a signal intensity measurement result, a time measurement result or an angle measurement result.

In one implementation manner, the first measurement result and/or the second measurement result are/is determined and reported by the terminal, or the first measurement result and/or the second measurement result are/is determined by the first-type positioning node and/or the second-type positioning node.

In one implementation manner, the terminal position information is determined by the first-type positioning node or the location management function entity based on the terminal position information sent by the second-type positioning node, where the terminal position information sent by the second-type positioning node is a terminal position obtained by the positioning of the second-type positioning node within a specified time.

In one implementation manner, the second configuration information is sent by the second-type positioning node to the first-type positioning node and/or the location management function entity.

In one implementation manner, the second configuration information is sent by the second-type positioning node based on a received positioning resource configuration information request, where the positioning resource configuration information request is sent by the first-type positioning node and/or the location management function entity.

In an implementation manner, the first-type positioning nodes and the second-type nodes communicate with the terminal respectively by using different wireless access technologies.

In one implementation manner, the first-type positioning node includes a wireless network device that performs communication based on a cellular network; and the second-type positioning node includes one or more of a wireless local area network device, a Bluetooth device or an ultra-wideband positioning device.

Figure 12:
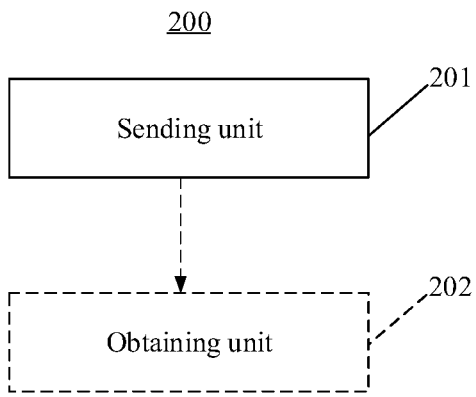
FIG. 12 is a block diagram of a positioning measurement apparatus according to an example.

FIG. 12 is a block diagram of a positioning measurement apparatus according to an example. Referring to FIG. 12, the positioning measurement apparatus 200 is performed by a network device and includes:

a sending unit 201, configured to send first configuration information and second configuration information, where the first configuration information is used to instruct a terminal to transmit and/or receive a first positioning signal for performing positioning measurement with a first-type positioning node, and the second configuration information is used to instruct the terminal to transmit and/or receive a second positioning signal for performing positioning measurement with a second-type positioning node.

In one implementation manner, the first configuration information is used to instruct the terminal to receive the first positioning signal, and the second configuration information is used to instruct the terminal to receive the second positioning signal.

In one implementation manner, the first configuration information is used to instruct the terminal to send the first positioning signal, and the second configuration information is used to instruct the terminal to second the second positioning signal.

In one implementation manner, the sending unit 201 is further configured to send terminal position information.

In one implementation manner, the terminal position information is determined based on a first measurement result, a second measurement result, position information of the first-type positioning node and position information of the second-type positioning node, where the first measurement result corresponds to the measurement result of measuring the first positioning signal, the second measurement result corresponds to the measurement result of measuring the second positioning signal, and the measurement result includes one or more of a signal intensity measurement result, a time measurement result or an angle measurement result.

In one implementation manner, the first measurement result and/or the second measurement result are/is determined and reported by the terminal, or the first measurement result and/or the second measurement result are/is determined by the first-type positioning node and/or the second-type positioning node.

In one implementation manner, the positioning measurement apparatus 200 further includes an obtaining unit 202, where the obtaining unit 202 is configured to: obtain the position information of the second-type positioning node sent by the second-type positioning node.

In one implementation manner, the terminal position information is determined by the first-type positioning node or the location management function entity based on the terminal position information sent by the second-type positioning node, where the terminal position information sent by the second-type positioning node is a terminal position within a specified time obtained by the positioning of the second-type positioning node.

In one implementation manner, where the obtaining unit 202 is configured to: obtain terminal position information sent by the second-type positioning node.

In one implementation manner, where the obtaining unit 202 is configured to: obtain second configuration information.

In one implementation manner, the sending unit 201 is further configured to send a positioning resource configuration information request, where the positioning resource configuration information request is used to request to obtain the second configuration information.

In one implementation manner, the sending unit 201 is further configured to send instruction information, where the instruction information is used to instruct the second-type positioning node to start transmitting the second positioning signal.

In an implementation manner, the first-type positioning nodes and the second-type nodes communicate with the terminal respectively by using different wireless access technologies.

In one implementation manner, the first-type positioning node includes a wireless network device that performs communication based on a cellular network; and the second-type positioning node includes one or more of a wireless local area network device, a Bluetooth device or an ultra-wideband positioning device.

With regard to the apparatus in the above embodiments, the specific manners in which various modules perform operations have been described in detail in the embodiments relating to the methods, and details are not described herein.

Figure 13:
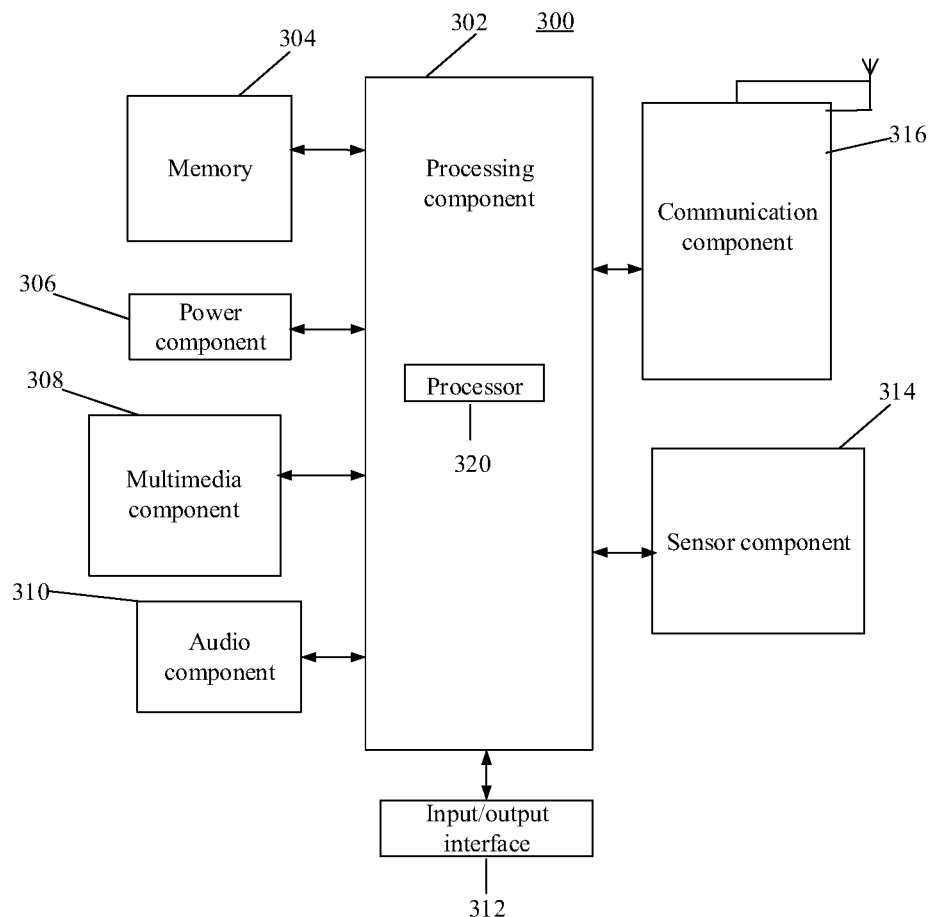
FIG. 13 is a block diagram of an apparatus used for positioning measurement, which is shown according to an example.

FIG. 13 is a block diagram of an apparatus 300 used for positioning measurement, which is shown according to an example; For example, the apparatus 300 may be a mobile phone, a computer, a digital broadcasting terminal, a messaging device, a game console, a tablet device, a medical device, a fitness device, a personal digital assistant, etc.

Referring to FIG. 13, the apparatus 300 may include one or more of the following components: a processing component 302, a memory 304, a power component 306, a multimedia component 308, an audio component 310, an input/output (I/O) interface 312, a sensor component 314, and a communication component 316.

The processing component 302 usually controls the overall operations of the apparatus 300, such as operations associated with display, telephone call, data communication, camera operation and recording operation. The processing component 302 may include one or more processors 320 to execute instructions to complete all of or part of the steps of the above method. In addition, the processing component 302 may include one or more modules to facilitate the interaction between the processing component 302 and other components. For example, the processing component 302 may include a multimedia module to facilitate interaction between the multimedia component 308 and the processing component 302.

The memory 304 is configured to store various types of data to support operations at the apparatus 300. Examples of these data include instructions for any application or method operated on the apparatus 300, contact data, phone book data, messages, pictures, videos, etc. The memory 304 may be implemented by any type of volatile or non-volatile storage device or a combination of them, such as a static random access memory (SRAM), an electrically erasable programmable read-only memory (EEPROM), an erasable. programmable read-only memory (EPROM), a programmable read-only memory (PROM), a read-only memory (ROM), a magnetic memory, a flash memory, a magnetic disk or an optical disk.

The power component 306 supplies power to various components of the apparatus 300. The power component 306 may include a power management system, one or more power sources, and other components associated with power generation, management and distribution of the apparatus 300.

The multimedia component 308 includes a screen for providing an output interface between the apparatus 300 and the user. In some embodiments, the screen may include a liquid crystal display (LCD) and a touch panel (TP). If the screen includes a touch panel, the screen may be implemented as a touch screen to receive input signals from the user. The touch panel includes one or more touch sensors to sense touches, slides and gestures on the touch panel. The touch sensor may sense not only the boundary of the touch or slide, but also the duration and pressure associated with the touch or slide. In some embodiments, the multimedia component 308 includes a front camera and/or a rear camera. When the apparatus 300 is in an operation mode, such as a shooting mode or a video mode, the front camera and/or the rear camera can receive external multimedia data. Each front or rear camera may be a fixed optical lens system or have focal length and optical zoom capability.

The audio component 310 is configured to output and/or input audio signals. For example, the audio component 310 includes a microphone (MIC), and when the apparatus 300 is in an operation mode, such as a call mode, a recording mode, and a voice recognition mode, the microphone is configured to receive external audio signals. The received audio signals may be further stored in the memory 304 or sent by the communication component 316. In an embodiment, the audio component 310 further includes a speaker for outputting audio signals.

The I/O interface 312 provides an interface between the processing component 302 and a peripheral interface module. The peripheral interface module may be a keyboard, a click wheel, buttons, etc. These buttons may include, but are not limited to a home button, a volume button, a start button, and a lock button.

The sensor component 314 includes one or more sensors for providing various aspects of status assessment for the apparatus 300. For example, the sensor component 314 may detect the on/off state of the apparatus 300, and relative positions of components such as a display and a keypad of the apparatus 300. The sensor component 314 may further detect a position change of the apparatus 300 or one component of the apparatus 300, the presence or absence of contact between the user and the apparatus 300, an orientation or acceleration/deceleration of the apparatus 300 and a temperature change of the apparatus 300. The sensor component 314 may include a proximity sensor configured to detect the presence of nearby objects without any physical contact. The sensor component 314 may further include an optical sensor, such as a CMOS or CCD image sensor, for use in imaging applications. In some embodiments, the sensor component 314 may further include an acceleration sensor, a gyroscope sensor, a magnetic sensor, a pressure sensor or a temperature sensor.

The communication component 316 is configured to facilitate wired or wireless communication between the apparatus 300 and other devices. The apparatus 300 may access a wireless network based on communication standards, such as WiFi, 2G or 3G, or a combination of them. In an exemplary example, the communication component 316 receives broadcast signals or broadcast associated information from an external broadcast management system via a broadcast channel. In an example, the communication component 316 further includes a near field communication (NFC) module to facilitate short-range communication. For example, the NFC module may be implemented based on a radio frequency identification (RFID) technology, an infrared data association (IrDA) technology, an ultra wide band (UWB) technology, a Bluetooth (BT) technology, and other technologies.

In an example, the apparatus 300 may be implemented by one or more application specific integrated circuits (ASICs), digital signal processors (DSPs), digital signal processing devices (DSPDs), programmable logic devices (PLDs), field programmable gate arrays (FPGAs), controllers, microcontrollers, microprocessors or other electronic elements to perform the above method.

In an example, a non-transitory computer-readable storage medium including instructions is further provided, such as a memory 304 including instructions executable by the processor 320 of the apparatus 300 to complete the above method. For example, the non-transitory computer-readable storage medium may be an ROM, a random access memory (RAM), a CD-ROM, a magnetic tape, a floppy disk, an optical data storage device, etc.

Figure 14:
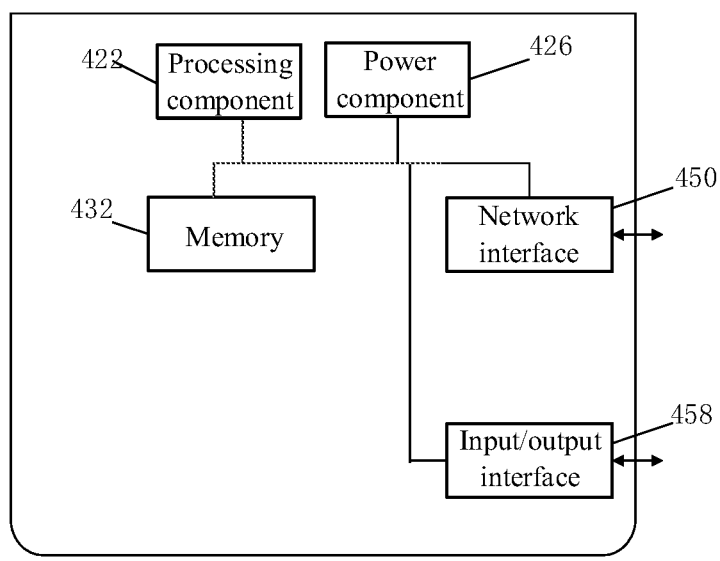
FIG. 14 is a block diagram of an apparatus used for positioning measurement, which is shown according to an example.

FIG. 14 is a block diagram of an apparatus 400 used for positioning measurement, which is shown according to an example; For example, the apparatus 400 may be provided as network device, such as a base station or the like. Referring to FIG. 14, the apparatus 400 includes a processing component 422, and further includes one or more processors, and a memory resource represented by the memory 432 and used for storing instructions capable of being executed by the processing component 422, such as application programs. The applications stored in the memory 432 may include one or more modules each corresponding to a set of instructions. In addition, the processing component 422 is configured to execute instructions to execute the above method.

The apparatus 400 may further include a power component 426 configured to execute power supply management on the apparatus 400, a wired or wireless network interface 450 configured to connect the apparatus 400 to a network, and an input/output (I/O) interface 458. The apparatus 400 may operate an operation system stored in the memory 432, such as Windows Server™, Mac OS X™, Unix™, Linux™, FreeBSD™ or the like.

In the examples, a non-transitory computer-readable storage medium including instructions is further provided, such as a memory 432 including instructions, and the instructions may be executed by the processing component 422 of the apparatus 400 to complete the above method. For example, the non-transitory computer-readable storage medium may be an ROM, a random access memory (RAM), a CD-ROM, a magnetic tape, a floppy disk, an optical data storage device, etc.

It can be further understood that "multiple" in the present disclosure refers to two or more than two, and that other quantifiers are similar. "And/or," which describes the association relationship of associated objects, indicates that three relationships can exist, for example, A and/or B, which can indicate the following three cases: A alone, both A and B, and B alone. The character "/" generally indicates an "or" relationship between former and later associated objects. Singular forms "a," "said," and "the" are also intended to include most forms, unless the context clearly indicates otherwise.

It is further understood that the terms "first," "second," etc., are used to describe a variety of information, but such information should not be limited to these terms. These terms are used only to distinguish the same type of information from one another and do not indicate a particular order or level of importance. In fact, the expressions "first" and "second" can be used interchangeably. For example, without departing from the scope of the disclosure, the first information may also be referred to as second information, and similarly, the second information may also be referred to as first information.

It may further be understood that, in the examples of the present disclosure, although the operations are described in a particular order in the figures, it should not be understood as requiring that these operations are executed in the particular order shown or in a serial order, or requiring that all the operations shown are executed to obtain desired results. In a specific environment, multitasking and parallel processing may be advantageous.

A person skilled in the art would readily conceive of other examples of the present disclosure after considering the specification and practicing the invention disclosed herein. The present application is intended to cover any variations, uses or adaptive changes of the present disclosure. These variations, uses or adaptive changes follow the general principle of the present disclosure and include common general knowledge or conventional technical means in the technical field that are not disclosed in the present disclosure. The specification and the examples are merely regarded as exemplary, and the real scope and spirit of the present disclosure are indicated by the following claims.

It should be understood that the present disclosure is not limited to the precise structure described above and shown in the drawings, and various modifications and changes can be made without departing from its scope. The scope of the present disclosure is only limited by the appended claims.

What is claimed is:

1. A positioning measurement method, performed by a terminal, and comprising:
   obtaining first configuration information and second configuration information that are sent by a first-type positioning node or a location management function entity, wherein the first configuration information is used to instruct the terminal to transmit and/or receive a first positioning signal for performing positioning measurement with the first-type positioning node, and the second configuration information is used to instruct the terminal to transmit and/or receive a second positioning signal for performing positioning measurement with a second-type positioning node;
   performing the positioning measurement based on the first configuration information and the second configuration information; and
   wherein the first-type positioning node and the second-type positioning node communicate with the terminal, respectively by using different wireless access technologies.

2. The positioning measurement method according to claim 1, wherein the first configuration information is used to instruct the terminal to receive the first positioning signal, the second configuration information is used to instruct the terminal to receive the second positioning signal.

3. The positioning measurement method according to claim 2,
   wherein the first configuration information comprises position information of the first-type positioning node, the second configuration information comprises position information of the second-type positioning node, and the method further comprises:
   determining a first measurement result and a second measurement result, wherein the first measurement result corresponds to the measuring the first positioning signal, the second measurement result corresponds to the measuring the second positioning signal, and the first measurement result and the second measurement result comprises one or more of a signal intensity measurement result, a time measurement result or an angle measurement result;
   wherein performing the positioning measurement based on the first configuration information and the second configuration information comprises:
   determining a position of the terminal based on the first measurement result, the second measurement result, the position information of the first-type positioning nodes, and the position information of the second-type positioning nodes.

4. The positioning measurement method according to claim 1, wherein the first configuration information is used to instruct the terminal to send the first positioning signal, and the second configuration information is used to instruct the terminal to send the second positioning signal.

5. The positioning measurement method according to claim 4, further comprising:
   obtaining terminal position information sent by the first-type positioning node or the location management function entity.

6. The positioning measurement method according to claim 5, wherein the terminal position information is determined by the first-type positioning node or the location management function entity based on a first measurement result, a second measurement result, the position information of the first-type positioning node and the position information of the second-type positioning node; and
   the position information of the second-type positioning node is sent to the first-type positioning node or the location management function entity by the second-type positioning node,
   wherein the first measurement result corresponds to the measuring the first positioning signal, the second measurement result corresponds to the measuring the second positioning signal, and the first measurement result and second measurement result comprises one or more of a signal intensity measurement result, a time measurement result or an angle measurement result;
   or,
   the terminal position information is determined by the first-type positioning node or the location management function entity based on the terminal position information sent by the second-type positioning node, the terminal position information sent by the second-type positioning node is a terminal position within a specified time obtained by positioning of the second-type positioning node.

7. The positioning measurement method according to claim 6, wherein at least one of the first measurement result or the second measurement result is determined and reported by the terminal, or
   at least one of the first measurement result or the second measurement result is determined by at least one of the first-type positioning node or the second-type positioning node.

8. The positioning measurement method according to claim 1, wherein the second configuration information is sent by the second-type positioning node to at least one of the first-type positioning node or the location management function entity;
   wherein the second configuration information is sent by the second-type positioning node based on a received positioning resource configuration information request, the positioning resource configuration information request is sent by at least one of the first-type positioning node or the location management function entity;
   wherein the first-type positioning node comprises a wireless network device communicating based on a cellular network, and the second-type positioning node comprises one or more of a wireless local area network device, a Bluetooth device, or an ultra-wideband positioning device.

9. A non-transitory computer-readable storage medium storing instructions, wherein the instructions when executed by a processor of a mobile terminal, cause the processor to execute the positioning measurement method according to claim 1.

10. A positioning measurement method, performed by network device, and comprising:

sending first configuration information and second configuration information, wherein the first configuration information is used to instruct a terminal to transmit and/or receive a first positioning signal for performing positioning measurement with a first-type positioning node, and the second configuration information is used to instruct the terminal to transmit and/or receive a second positioning signal for performing positioning measurement with a second-type positioning node;

wherein the positioning measurement is performed based on the first configuration information and the second configuration information; and wherein the first-type positioning node and the second-type positioning node communicate with the terminal, respectively by using different wireless access technologies.

11. The positioning measurement method according to claim 10, wherein the first configuration information is used to instruct the terminal to receive the first positioning signal, and the second configuration information is used to instruct the terminal to receive the second positioning signal.

12. The positioning measurement method according to claim 10, wherein the first configuration information is used to instruct the terminal to send the first positioning signal, and the second configuration information is used to instruct the terminal to send the second positioning signal.

13. The positioning measurement method according to claim 12, further comprising:

sending terminal position information.

14. The positioning measurement method according to claim 13, wherein the terminal position information is determined based on a first measurement result, a second measurement result, position information of the first-type positioning node and position information of the second-type positioning node, wherein the first measurement result corresponds to the measuring the first positioning signal, the second measurement result corresponds to the measuring the second positioning signal, and the first measurement result and the second measurement result comprises one or more of a signal intensity measurement result, a time measurement result or an angle measurement result, the position information of the second-type positioning node is sent by the second-type positioning node;

or, the terminal position information is determined by the first-type positioning node or the location management function entity based on the terminal position information sent by the second-type positioning node, the terminal position information sent by the second-type positioning node is a terminal position within a specified time obtained by positioning of the second-type positioning node.

15. The positioning measurement method according to claim 14, wherein at least one of the first measurement result or the second measurement result is determined and reported by the terminal, or at least one of the first measurement result or the second measurement result is determined by at least one of the first-type positioning node or the second-type positioning node.

16. The positioning measurement method according to claim 10, further comprising:

sending a positioning resource configuration information request, wherein the positioning resource configuration information request is used to request to obtain the second configuration information.

17. The positioning measurement method according to claim 10, further comprising:

sending instruction information, wherein the instruction information is used to instruct the second-type positioning node to start transmitting the second positioning signal;

wherein the first-type positioning node comprises a wireless network device communicating based on a cellular network, and the second-type positioning node comprises one or more of a wireless local area network device, a Bluetooth device, or an ultra-wideband positioning device.

18. A positioning measurement apparatus, comprising:

a memory; and a processor that is communicatively coupled to the memory;

wherein the processor is configured to execute the positioning measurement method according to claim 10.

19. A non-transitory computer-readable storage medium storing instructions, wherein the instructions when executed by a processor of network device, cause the processor to execute the positioning measurement method according to claim 10.

20. A positioning measurement apparatus, comprising:

a memory; and a processor that is communicatively coupled to the memory, wherein the processor is configured to:

obtain first configuration information and second configuration information that are sent by a first-type positioning node or a location management function entity, wherein the first configuration information is used to instruct a terminal to transmit and/or receive a first positioning signal for performing positioning measurement with the first-type positioning node, and the second configuration information is used to instruct the terminal to transmit and/or receive a second positioning signal for performing positioning measurement with a second-type positioning node;

perform the positioning measurement based on the first configuration information and the second configuration information; and wherein the first-type positioning node and the second-type positioning node communicate with the terminal, respectively by using different wireless access technologies.

* * * * *

UNITED STATES PATENT AND TRADEMARK OFFICE
CERTIFICATE OF CORRECTION

| | | |
|---|---|---|
| PATENT NO. | : 12,436,225 B2 | Page 1 of 1 |
| APPLICATION NO. | : 18/013831 | |
| DATED | : October 7, 2025 | |
| INVENTOR(S) | : Mingju Li | |

It is certified that error appears in the above-identified patent and that said Letters Patent is hereby corrected as shown below:

In the Specification

In Column 1, Line 24, delete "reception" and insert -- and reception --, therefor.
In Column 3, Line 12, delete "described as detailed" and insert -- described in detail --, therefor.
In Column 4, Lines 30-31, delete "Internet of Vehicles (V2X)" and insert -- Internet of Vehicles (IoV) --, therefor.
In Column 5, Line 2, delete "Internet of Vehicles (V2X)" and insert -- Internet of Vehicles (IoV) --, therefor.
In Column 6, Line 14, delete "entity. in" and insert -- entity. In --, therefor.
In Column 7, Line 22, delete "that" and insert -- as --, therefor.
In Column 9, Line 45, delete "obtaining" and insert -- Obtaining --, therefor.
In Column 13, Line 22, delete "born" and insert -- stored --, therefor.
In Column 19, Line 66, delete "second" and insert -- send --, therefor.
In Column 21, Line 11, delete "second" and insert -- send --, therefor.
In Column 22, Line 42, delete "erasable." and insert -- erasable --, therefor.
In Column 24, Line 22, delete "operation" and insert -- operating --, therefor.

Signed and Sealed this
Ninth Day of December, 2025

John A. Squires
*Director of the United States Patent and Trademark Office*